United States Patent [19]

Manwiller

[11] 4,238,538
[45] Dec. 9, 1980

[54] METHOD OF AND APPARATUS FOR RAM-EXTRUSION OF AROMATIC POLYIMIDE AND POLYAMIDE RESINS, AND SHAPED ARTICLES FORMED USING SUCH METHOD AND APPARATUS

[75] Inventor: Carl H. Manwiller, Wilmington, Del.

[73] Assignee: E. I. Du Pont de Nemours and Company, Wilmington, Del.

[21] Appl. No.: 971,675

[22] Filed: Dec. 21, 1978

[51] Int. Cl.³ .................... B29D 23/01; B29F 3/04
[52] U.S. Cl. .................................. 428/36; 264/126; 264/209; 264/211; 264/323; 264/331; 425/461; 428/372; 428/401
[58] Field of Search ............... 264/233, 211, 331, 209, 264/126, 323; 425/376 R, 376 A, 461; 528/182; 428/36, 220, 372, 401

[56] References Cited

U.S. PATENT DOCUMENTS

| | | | |
|---|---|---|---|
| 2,863,174 | 12/1958 | Schuman et al. | 264/127 |
| 3,179,614 | 4/1965 | Edwards | 260/30.2 |
| 3,179,631 | 4/1965 | Endry | 260/78 R |
| 3,249,588 | 5/1966 | Gall | 528/182 |
| 3,413,394 | 11/1968 | Jordan | 264/126 |
| 3,874,837 | 1/1975 | Jamieson | 425/461 |
| 3,925,323 | 12/1975 | Turnbull | 260/78 S |
| 3,954,703 | 5/1976 | Turnbull | 260/37 N |
| 3,980,746 | 9/1976 | Carrow | 264/209 |
| 4,056,597 | 11/1977 | Cooper | 425/461 |

Primary Examiner—Jeffery R. Thurlow

[57] ABSTRACT

A method of forming a shaped article from non-melt fabricatable, high temperature, polymeric (polyimide and polyamide) resins, using an apparatus including a die with compaction, back pressure and relief zone. Such resins are ram-extruded at a temperature of between about 20° C. and 400° C., but below the second order glass transition temperature of the resin to form a shaped article, followed by heating at a temperature above about 250° C. for a time sufficient to coalesce the resin. Such method and apparatus is particularly well-suited to produce close tolerance articles of precise dimensions, such as rods and tubes.

10 Claims, 4 Drawing Figures

METHOD OF AND APPARATUS FOR RAM-EXTRUSION OF AROMATIC POLYIMIDE AND POLYAMIDE RESINS, AND SHAPED ARTICLES FORMED USING SUCH METHOD AND APPARATUS

TECHNICAL FIELD

This invention is a method of an apparatus for continuously forming shaped articles from polymeric resin using ram-extrusion techniques. The resins used are non-melt fabricatable, high temperature, essentially linear resins having a second order glass transition temperature greater than 250° C., and include aromatic polyimides and aromatic polyamides which are coalesceable from powder form into shaped articles having generally improved tensile strength and thermal expansion properties.

BACKGROUND ART

It is known, in the prior art, to form shaped articles from non-melt fabricatable (i.e., intractable) polymeric resins using non-extrusion techniques, as it is to extrusion-form shaped articles from resins that are melt formable. Prior to this invention, however, the art had found no techniques for forming shaped articles from non-melt fabricatable, particulate aromatic polyamide or polyimide resins, using ram-extrusion techniques.

Intractable, high temperature, polymeric resins having a glass transition temperature of at least 250° C. tend to degrade well below their crystalline melting points and thus cannot be fabricated in a molten state. Further, it is known that the brittleness of such resins has prevented the use of known extrusion techniques in forming shaped articles. For this reason the methods which have evolved for forming shaped articles from this specific type of resin have been primarily compressive in nature, using combinations of pressure and heat.

A typical method of preparing shaped articles from these non-melt fabricatable type polymeric resins is shown in U.S. Pat. No. 3,413,394 to Jordan, which teaches subjecting such powder to a pressure of at least 69 MPa while maintaining the temperature of the resin at between room temperature and the temperature at which the powder will coalesce under the applied pressure, releasing the pressure on the pressed powder, and heating the pressed powder to a temperature of at least 400° C. in the substantial absence of applied pressure for from about 5 to about 20 minutes to coalesce such powder into the shaped article. This method is non-continuous and the mold in which the powder is pressed must be recharged each time an article is prepared. Additionally, the ability to make finely dimensioned shaped articles such a long rods and tubes having improved tensile strength and other desired properties is limited when using this method.

Another compressive-type method in wide use involves charging polyimide resin to rubber bags and then subjecting the rubber bags to approximately 69 MPa pressure at room temperature in an autoclave. After removing the rubber bags, the green shaped articles or preforms are transferred to a hot pressure vessel where they are subjected beneath a molten lead bath to a temperature of 420° C. at 103 MPa pressure. After removal from the hot pressure vessel the preform is subjected to an acid treatment to remove the lead coating. The preform at this point is characteristically quite irregular dimensionally and in many cases "bowed" as well and requires either machining or centerless grinding to provide a finished article suitable for automatic machine work. All in all, this method is characterized by low productivity, low yield, and high cost.

Ram extrusion of materials characterized by their high ductility, such as polytetrafluoroethylene resins, and metals, such as copper and aluminum, through a die is well known in the art. It has long been known that this type method, being continuous in nature and having the capability of imparting orientation to the shaped article, might also well prove best for non-melt fabricatable polymeric resins if problems, such as cracking of the resin during extrusion, could be solved.

An example of a typical extrusion method is known in U.S. Pat. No. 2,863,174 to Schuman et al. In using known dies of this type for forming articles from non-melt fabricatable polyimide and polyamide resins, however, cracking occurs. Since the art could not solve this cracking problem during extrusion, and since no methods were known for extruding non-melt fabricatable resins, other less desirable batch methods involving pressure/temperature combinations, as described above, were developed.

This invention has solved this problem by designing a new die having a configuration which enables non-melt fabricatable resins to be extruded without cracking, and which imparts in the shaped article so extruded improved properties heretofore not known to the art.

No teaching of the solid state extrusion of a non-melt fabricatable material, such as an aromatic polyimide resin, was known, prior to the discovery of this die and of the method of this invention. Such new method utilizing the direct ram extrusion of aromatic polyimide and aromatic polyamide resins to form shaped articles eliminates the difficulties, high cost, and low yield characteristics of the current compressive processes. In view of the intractability and brittleness of green, or unsintered, polyimide and polyamide moldings, it was surprising to find that high quality articles could be made by such an extrusion method.

The die profile is a cardinal parameter in this extrusion method; it must provide back pressure through a reduction zone as well as controlled relief in the exit area of the die.

Relative to the current compressive processes for producing shaped articles, this extrusion process offers (1) a marked reduction in the cost of manufacture, (2) a dimensionally precise product, (3) a wide range of shapes, and (4) a marked advantage in producing small diameter stock shapes. Beyond this, operating difficulties associated with the compressive processes, such as lead penetration, bending of the stock shapes due to the buoyant effects of the molten lead, and the gross dimensional variability across the axial length of the stock with the attendant yield loss in finishing are eliminated.

The above-mentioned patents do not show, nor does any known art show, an extrusion method for forming a shaped article from non-melt fabricatable polymeric material. Instead the art, knowing that the brittleness of the resin causes cracking of article during extrusion, turned to compressive techniques to solve this problem.

Accordingly, prior to this invention, there was a need for an extrusion method that will work in continuously forming shaped articles from high temperature, aromatic polyamide and polyimide resins, to improve both the properties of the shaped article and the method itself. This invention, in solving the problems previously mentioned, provides such a method and, in so doing, gives to the extrusion and shaped article arts improvements heretofore not known to them.

SUMMARY OF THE INVENTION

Briefly described, this invention is a method of forming a shaped article from a non-melt fabricatable polymeric resin in a die having means defining (a) a compaction zone, followed by (b) a back pressure zone, followed by (c) a relief zone, such method including the steps of:
compacting the resin in the compaction zone, while simultaneously
providing back pressure on such resin at the exit of the compaction zone by moving the compacted resin through the back pressure zone, and, thereafter,
relieving the pressure on the resin in the relief zone to control the rate of elastic recovery thereof as such compacted resin is moved through the relief zone to form the shaped article.

This shaped article preferably is then heated at a temperature above about 250° C. for a time sufficient to coalesce the resin to form a coalesced shaped article.

The resin used in the above-described method preferably is an aromatic polyimide or an aromatic polyamide.

This invention further is an extrusion apparatus for forming a shaped article from certain aromatic polymeric resins including:

(1) a barrel having walls having inner surface means defining a chamber for receiving such resin,
(2) an extrusion die connected to the barrel in an axial direction, the die having walls with inner surface means including:
  (a) first surface means starting at one end of the die and extending in such axial direction and inwardly at an angle of less than 45° from an edge of such inner surface means of the barrel, the first surface means defining a compaction zone,
  (b) second surface means extending in such axial direction from the first surface means, the second surface means defining a back pressure zone, and
  (c) third surface means extending in such axial direction and outwardly from the second surface means and defining a relief zone, and
(3) an extrusion ram mounted for reciprocation within the chamber, whereby, upon movement thereof in such axial direction, such resin is:
compacted in the compaction zone, which compacted resin is then
moved through the back pressure zone while simultaneously providing back pressure on such resin, and, thereafter, such compacted resin is
moved through such relief zone, thereby relieving the pressure on such resin, and out of the other end of the die, whereby to form such shaped article.

The first surface means may extend inwardly at an angle of about 30° from the edge of the inner surface means of the barrel and, preferably, such first surface means extends inwardly at an angle of about 15° from the edge of the inner surface means of the barrel.

Preferably the third surface means extends outwardly from the second surface means at an angle which results in radial recovery of such compacted resin of about 5 percent, after it leaves the back pressure zone.

Lastly, this invention is a shaped article formed on a non-melt fabricatable polymeric resin, such shaped article being oriented primarily in the direction of extrusion and having a thermal expansion in the axial direction of less than about 50 $\mu m/m/°C$. at a temperature of from about room temperature to 300° C.

In one embodiment, the shaped article is a tube and the thickness of the walls thereof is less than about 25 mm; in another embodiment, the shaped article is a rod having a diameter of less than about 25 mm.

This invention solves problems existent in the prior art in which shaped articles could be made from non-melt fabricatable polymeric resins only by using compressive methods, including pressure and heat, since cracking occurs using known dies when extruding such resins. This cracking problem has been solved, by this invention, by designing the die so that it controls the extrusion parameters that cause cracking.

The key to success involved the recognition of the importance of die profile in maintaining back pressure in the reduction zone and providing controlled relief at the die exit. Because a green preform of polyimide resin is very brittle, it can withstand very little deformation or strain before fracture occurs. However, if the zone in which deformation is taking place is confined or protected by surrounding pressure, appreciable deformation can be achieved without incurring subsequent cracking. While the reduction angle is seemingly not critical, it must be less than 45°. The straight section of the die following the reduction zone provides back pressure at the exit of the reduction zone due to the inherent radial recovery of the extruded shaped article and the resulting drag along the walls. This recovery will result in a radial growth upon exiting the die of about 3 to 5 percent. If the die is not relieved along the exit section, the radial recovery occurs at an interface which characteristically produces axial cracking of the extruded article. Relief of the exit die to a diameter slightly greater than the final recovered diameter of the extruded shaped article effectively eliminates such cracking difficulties.

DESCRIPTION OF A PREFERRED EMBODIMENT

This invention is a method of and apparatus for forming shaped articles from non-melt fabricatable aromatic polymeric (polyamide and polyimide) resins.

More particularly such invention relates to the continuous forming of precision shaped articles from non-melt fabricatable, particulate, high-temperature polymeric resins. It further is particularly directed to the forming of these articles from such high-temperature resins as aromatic polyimides, aromatic polyamides, aromatic polybenzimidazoles, aromatic polybenzoxazoles, aromatic polybenzoylenebenzimidazoles, etc. If desired, such polymeric resins may be blended with inert hard or soft filler materials in the form of finely divided powder or short fibers of such materials as metals, metal oxides, minerals, inorganic compounds, graphite and thermally stable synthetic resins, such as fluorocarbon polymers.

A preferred aromatic polyimide resin for use in the practice of this invention is an essentially linear aromatic polyimide powder having a second order transition temperature above 500° C. and a room temperature flexural modulus, as molded, of at least 2.1 GPa which is prepared by reacting 4,4'-oxydianiline with pyromellitic dianhydride essentially according to the procedures set forth in U.S. Pat. No. 3,179,631 to Endrey and U.S. Pat. No. 3,249,588 to Gall, the teachings of which are incorporated by reference herein. Another aromatic polyimide resin that is useful in the practice of this invention is one based on benzophenone tetracarboxylic dianhydride.

A preferred aromatic polyamide resin for use in this invention is a coalescible and densifiable powder of poly-(metaphenylene isophthalamide) as is disclosed in U.S. Pat. No. 3,925,323 to Turnbull, the teachings of which also are incorporated by reference herein. This powder is produced by adding a solution of poly(metaphenylene isophthalamide) in a solvent of dimethyl formamide or dimethyl acetamide to water to form a slurry. After filtration of the slurry, a filter cake is washed, dried and comminuted resulting in a powder which is coalescible and densifiable. This poly(metaphenylene isophthalamide) powder sinters at a temperature below its crystalline melting point which allows the production of solid and homogeneous shaped articles according to the practice of this invention.

The present invention relates to a method of preparing shaped articles formed of high molecular weight organic polymers and, more particularly, to shaped articles capable of being heat-treated to develop high tensile strength and formed of essentially linear polymeric resins having a second order transition temperature above 250° C. and a room temperature modulus as molded above 2.1 GPa.

The class of resins characterized as essentially linear polymeric resins having a second order transition temperature above 250° C. and a room temperature modulus as molded above 2.1 GPa includes aromatic polyimides, aromatic polyamides, aromatic polyamide-imides, aromatic polyketones, aromatic polyimines, polybenzotriazoles and aromatic polythiazoles. These polymeric resins are prepared in the form of a powder by procedures such as those set forth in the previously mentioned U.S. Pat. No. 3,179,631 to Endry. Such polymeric resin powders are characterized by having a low crystallinity as derived from an X-ray diffractometer scan from resin powder. These resin powders are further characterized by having a high surface area, at least 0.5 sq. meter/gram, usually above 1, and preferably from 2 to 500 sq. meters per gram, as measured using the technique described by F. E. Nelsen and F. T. Eggerton, Analytical Chemistry, Vol. 30, 1387 (1958). Such powders can be coalesced into shaped articles which display outstanding physical and chemical properties, especially resistance to thermal degradation. These resins exhibit a tendency to degrade well below their crystalline melting points and thus cannot be fabricated in the molten state.

The finely-divided, high surface area polyimides used in this invention can be made to coalesce at temperatures below the crystalline melting point into solid, homogeneous articles under the influence of heat and pressure but they cannot be molded or sintered by conventional techniques. The coalescing process requires the application of a pressure of from 14 to about 21 MPa to the particulate polyimide after the particles have been heated to a temperature in the range of 200° to about 500° C., but below the crystalline melting point of the polyimide. The particulate polyimide can be heated to the requisite temperature either before or after it is placed in the mold. Although some deformation or flow of these polyimide particles is necessary to obtain coalescence, such flow or deformation is extremely limited in these polyimide particles thereby making fabrication by conventional plastics-forming techniques impractical.

Various fillers may be admixed with the particulate essentially linear resins to vary such properties thereof as the thermal conductivity, lubricating and abrasive properties and the like. Such fillers may include: silicon carbide, molybdenum disulfide, cryolite, particulate polytetrafluoroethylene resin, boron nitride, iron sulfide, sodium chloride, asbestos, clay, mica, vermiculite, metal carbides, kaolin, metal oxides, graphite, mixtures thereof and the like.

It has been found in accordance with this invention that a shaped article having improved properties may be formed, using ram-extrusion techniques, from these non-melt fabricatable polymeric resins. More specifically it has been found such articles may be formed using an extrusion apparatus having a novel die that prevents cracking. Briefly described, such apparatus generally includes a barrel and a die shaped so as to provide back pressure in the reduction zone and controlled relief at the die exit to thereby prevent cracking.

Figure 1:
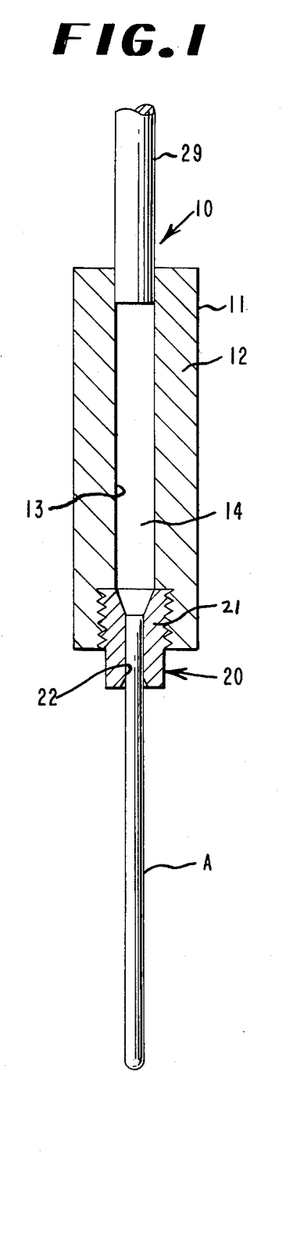
FIG. 1 is a cross-sectional view of an apparatus of the invention, which apparatus is suitable for carrying out a method of extruding shaped articles from intractable polymeric resins, also of this invention.
Figure 2:
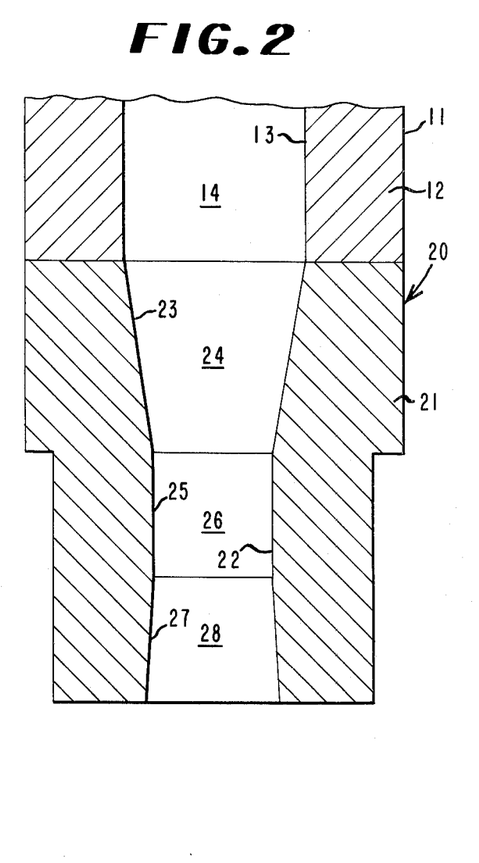
FIG. 2 is a cross-sectional view, showing in greater detail the novel extrusion die of the apparatus of FIG. 1 whereby the forming of the shaped articles, also of this invention, is made possible without cracking during extrusion.

Referring to the drawings, an apparatus of this invention, generally designated 10, is shown in FIGS. 1 and 2. Such extrusion apparatus for forming a shaped article from an aromatic polymeric resin includes:

(1) a barrell 11 having walls 12 having inner surface means 13 defining a chamber 14 for receiving such resin, as shown,
(2) an extrusion die 20 connected to the barrell 11 in an axial direction, such die having walls 21 with inner surface means 22 including:
   (a) first surface means 23 starting at one end of the die and extending in such axial direction and inwardly at an angle of less than 45° from an edge of such inner surface means 13 of the barrel, such first surface means 23 defining a compaction zone 24,
   (b) second surface means 25 extending in such axial direction from the first surface means 23, such second surface means defining a controlled back pressure zone 26, and
   (c) third surface means 27 extending in such axial direction and outwardly from the second surface means 25 and defining a relief zone 28, and
(3) an extrusion ram 29 mounted for reciprocation within said chamber 14, whereby, upon movement thereof in such axial direction, such resin is:
   compacted in the compaction zone 24, which compacted resin is then moved through the back pressure zone 26, while simultaneously providing back pressure on such resin, and, thereafter, such compacted resin is moved through such relief zone 28, thereby relieving the pressure on such resin, and out of the other end of the die 20, whereby to form a shaped article A.

In a preferred embodiment the first surface means 23 extends inwardly at an angle of about 30° from the edge of said inner surface means 13 of the barrel, which defines the chamber 14. It is understood that, if desired, the die may be designed to include a straight section which will define with the inner surface means 13 which defines the chamber, or may start with the first surface means 23 extending inwardly, as shown and described. The important thing is that the reduction angle from the straight walls defining the chamber, as defined by the first surface means 23, must be less than 45°; otherwise, as will further be explained, the extrusion apparatus and method of this invention will not work properly and the extruded shaped non-melt fabricatable article will crack.

Preferably, the angles defined by inner surface means 22 of the die are "rounded"; this includes the reduction angle and the other angles leading from the straight sections, for improved die operation.

In another preferred embodiment the first surface means 23 extends inwardly at an angle of about 15° from the edge of such inner surface means of the barrel.

Lastly, in still another preferred embodiment, the third surface means 27 extends outwardly from the second surface means 25 at an angle which results in radial recovery of such compacted resin of about 5 percent, after it leaves the back pressure zone 26.

FIG. 1 shows a basic ram extension apparatus for polyimide resin. The barrel chamber 14 is filled with compacted resin from 4 separate filling operations. This drawing shows the condition immediately before the extrusion stroke. At the exit of the die the previously extruded rod is held in place by its projection within the die. This rod will be released during the extrusion of the charge existing in the extrusion barrel. The length of the extruded article will be equal to the ram stroke times the die area reduction ratio divided by the compression ratio of the resin charge in the barrel. The reduction ratio is about 2.5 to 3.0 and the compression ratio for the compacted resin will be about 1.5 giving an extruded article length two times the ram stroke.

Tubular articles can also be produced using a ram extrusion apparatus of the general type as shown in FIG. 1. A "pipe-type" die well known to those skilled in the art would be employed to fabricate such tubular articles. Such a die would have a core rod centered within the extrusion die cavity.

While the extrusion method can be operated at room temperature, elevated temperatures reduce the required ram force and produce a more attractive extruded article of superior properties. At 200° C. the ram force is reduced from 222 Kn to 71 Kn for the extrusion of 25.4 mm diameter rods.

Likewise, while the extrusion can be executed with virgin resin compositions, addition of a lubricant decreases the required ram force. Polytetrafluoroethylene resin is the preferred lubricant and is functional at a concentration of 0.1 to 0.5 weight percent.

This invention finds many applications. The useful combination of the desirable electrical, physical and chemical characteristics of the polymers used in this invention is unique. Since fabricated articles of these polyimide particles retain their strength and excellent response to work-loading at elevated temperatures for prolonged periods of time, they offer commercial utility in a wide range of end uses. The polyimide polymers used in this invention are distinguished in having a combination of excellent resistance to corrosive atmospheres, an outstanding resistance to degradation by high energy particles and gamma ray radiation. These polymers resist melting upon exposure at high temperatures (many of them over 500° C.) for extended periods while retaining hitherto unrealized high proportions of room temperature physical properties. Because of the unusual and surprising ability of the high surface area particles to coalesce at a temperature below the crystalline melting point under heat and pressure, these polymers may be processed into many desirable articles not obtainable by any other means.

The polyimides of this invention are also useful in combination with other materials, e.g., finely divided metals, metal oxides, minerals, synthetic inorganics, glasses and other high temperature polymers such as polytetrafluoroethylene. These materials may be incorporated as suspensions in the polymer precipitation solutions so that they will be intimately mixed with the high surface area polyimide particles produced therefrom. They may also be incorporated by mixing of the finished polyimide with the modifying solid also in finely divided state. Graphite improves the frictional characteristics. Finely divided aluminum makes the solid polyimide conductive. Inorganic fillers improve stiffness.

Shaped Articles

The shaped articles of this invention, formed using the method and apparatus also of this invention, as previously described have many desirable properties, including improved tensile strength and thermal expansion properties.

A coalesced shaped article of this invention, for example, formed of a non-melt fabricatable polymeric resin by ram-extrusion is oriented primarily in the direction of extrusion and has a thermal expansion in the axial direction of less than about 50 $\mu$m/m°C. at a temperature of from about room temperature to 300° C.

The shaped article may be made using aromatic polyimide or aromatic polyamide resins.

In one preferred embodiment the article is a tube and the thickness of the walls thereof is less than about 25 mm.

In another preferred embodiment, the shaped article is a rod having a diameter of less than about 25 mm.

The following examples will provide other details as to the operation of the method and apparatus of this invention, and from them it will be seen that shaped articles having improved properties may be formed by ram-extrusion of non-melt fabricatable aromatic polyimide and polyamide resins.

EXAMPLES

The non-melt fabricatable polyimide reins used in these examples were made from pyromellitic dianhydride and 4,4'-oxydianiline followed the teachings of U.S. Pat. Nos. 3,179,614 and 3,179,631. Such resins were extruded under conditions as will be described to form shaped articles, which were sintered under a nitrogen blanket using one of the following cycles to form coalesced shaped articles:

A.
  1. Heated from room temperature to 150° C. in 1 hour
  2. 150° C. to 400° C. at 1° C./min
  3. 400° C. for 3 hours
  4. Cooled
B.
  1. Heated from room temperature to 150° C. in 2 hours
  2. 150° C. to 400° C. in 29 hours
  3. 400° C. for 5 hours
  4. Cooled
C.
  1. Heated from room temperature to 150° C. in 4 hours
  2. 150° C. to 400° C. in 57 hours
  3. 400° C. for 4 hours
  4. Cooled
D.
  1. Heated from room temperature to 50° C. in 1 hour
  2. 50° C. to 420° C. in 67 hours
  3. 420° C. for 2 hours
  4. Cooled
E.
  1. Heated from room temperature to 50° C. in 1 hour
  2. 50° C. to 400° C. in 65 hours
  3. 400° C. for 6 hours
  4. Cooled The non-melt fabricatable polyamide resins used in these examples were made following the teachings of U.S. Pat. No. 3,925,323. Such resins, after extrusion, were sintered by heating under nitrogen at 250° C. for 72 hours, raising the temperature to 300° C. at a rate of 5° C. per hour, maintaining the temperature at 300° C. for 1 hour, and cooling.

EXAMPLE 1

Working with extrusion apparatus including a die without a relief zone and with extrusion apparatus in accordance with this invention including a die with a relief zone, as shown, for example, in FIGS. 1 and 2, several non-melt fabricatable (i.e., intractable) polyimide resins were extruded at room temperature. Both dies had a diameter of 13.1 mm at the end of the die next to the barrel chamber (at the start of the compaction zone); a diameter of 7.92 mm throughout the back pressure zone; and the length of all the zones were the same, in both dies, as was the reduction angle, (i.e., 30°). The only difference between the dies is that one die had no relief zone and, thus, the diameter at the other end or exit of this die was the same as that of the back pressure zone, (i.e., 7.92 mm); whereas the other die had a relief zone and the diameter at the exit of this die was 8.18 mm.

The method used involved compacting the resin in the barrel at 13.8 MPa pressure and then extruding the charge. The green extruded shaped articles were sintered via cycle A. The extrusion force, rod appearance and quality are summarized in the following table (Table I):

TABLE I

| Aromatic Polyimide Resin | Extrusion Apparatus | Extrusion Force (kN) | Rod Description | Rod Tensile Strength (MPa) | Elong. (%) | Density (g/cc) |
|---|---|---|---|---|---|---|
| Base Resin + 0.05 wt. % DLX-6000* | Without Relief Zone | 35.6 | Axial Splits | — | — | — |
| Base Resin + 0.05 wt. % DLX-6000* | With Relief Zone | 44.5 | Excellent Appearance | 127.5 | 22 | 1.422 |
| Base Resin + 0.15 wt. % DLX-6000* | Without Relief Zone | 31.1 | Severe Fractures | — | — | — |
| Base Resin + 0.15 wt. % DLX-6000* | With Relief Zone | 31.1 | Excellent Appearance | 114.4 | 9 | 1.413 |
| Base Resin + 0.5 wt. % PTFE | Without Relief Zone | 35.6 | Severe Fractures | — | — | — |
| Base Resin + 0.5 wt. % PTFE | With Relief Zone | 44.5 | Excellent Appearance | 88.2 | 8 | 1.415 |

*Du Pont Lubricant Powder, a particulate PTFE resin

This represented a successful extrusion of polyimide resin on a controlled and repeatable basis and demonstrates the importance of relieving pressure under controlled conditions on the compacted resin as it exits the die; for example, it will be noted that fractures or axial cracking or splits occurred when using the die without the relief zone.

EXAMPLE 2

Working with a larger preferred extrusion apparatus, also having a relief zone, high quality 25.4 mm diameter rods were extruded using intractable polyamide resins. The die used in extruding the shaped articles of this example had a diameter of 38.1 mm at the end of the die next to the barrel chamber (at the start of the compaction zone); a diameter of 24.6 mm across the back pressure zone and the diameter at the exit of the relief zone of the die was 25.7 mm. As to lengths, the chamber was 222.3 mm long; the compaction zone, 25.4 mm; the back pressure zone, 38.1 mm; and the relief zone, 25.4 mm. The reduction angle was 15°.

The operating procedure was the same as described in Example I except the extrusion was carried out typically at 200° C. The length of extrudate was limited to 254 to 279 mm by press geometry. The extrusion force was 71.2 kN. Other details are shown in the following Table (Table II):

TABLE II

| Resin | Extrusion Conditions °C. | Extrusion Conditions Force (kN) | Rod Condition | Tensile Strength (MPa) | Elong. (%) |
|---|---|---|---|---|---|
| Aromatic Polyamide | 250 | 71.2 | Green | 26.2 | 0.6 |
| Aromatic Polyamide | 250 | 71.2 | Sintered | 95.8 | 2.3 |
| Aromatic Polyamide* | 250 | 71.2 | Green | 22.4 | 0.7 |

TABLE II-continued

| Resin | Extrusion Conditions °C. | Force (kN) | Rod Condition | Tensile Strength (MPa) | Elong. (%) |
|---|---|---|---|---|---|
| Aromatic Polyamide* | 250 | 71.2 | Sintered | 38.2 | 1.4 |

*Contains 12% graphite

This examle demonstrates that non-melt fabricatable polyamide resins may be extruded into useful shaped articles.

EXAMPLE 3

Working with an extrusion die similar to that used in Example 2, but having a 45° reduction angle, a variety of non-melt fabricatable polyimide resins were extruded at temperatures from 23° C. to 250° C. Such die had a diameter of 38.1 mm at the end of the die next to the barrel chamber (at the start of the compaction zone); a diameter of 24.6 mm across the back pressure zone and the diameter at the exit of the relief zone of the die was 25.9 mm. As to lengths, the chamber was 222.3 mm long; the compaction zone, 9.7 mm; the back pressure zone, 41.1 mm; and the relief zone, 38.1 mm. The reduction angle as previously stated was 45°.

For all cases, the extrusion failed to produce any integral rod and the extrudate was in the form of random sized (1.6 mm to ~12.7 mm) granules.

This example shows the reduction angle must be less than 45°.

EXAMPLE 4

Orientation is known to produce improved tensile strength and anisotropic thermal expansion; and it has been found that the axial expansion for an extruded shaped article made in accordance with this invention is substantially lower than that of an isostatic or hot-molded shaped article formed using pressure and heat. Tests have shown, for example, that such shaped articles made by ram-extrusion have an axial thermal expansion of less than 50 μm/m/°C. at a temperature of from about room temperature to 300° C., while the isostatic or molded shaped article has an axial thermal expansion of over 80 μm/m/°C. at about 250° C. for the basic polyimide resin and 68 μm/m/°C. at about 300° C. for this basic resin containing 15% by weight of graphite.

Figure 3:
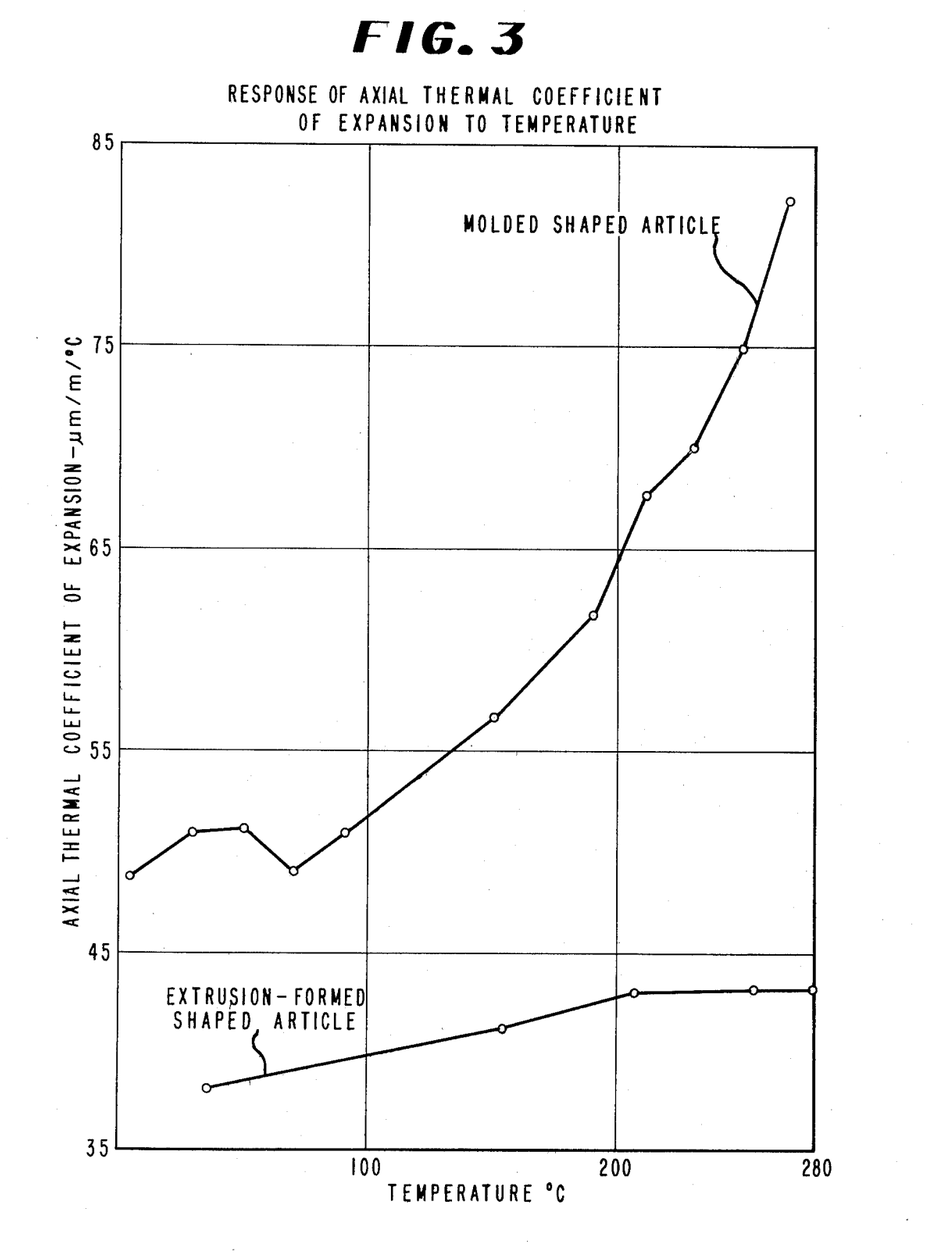
FIG. 3 shows the response of axial thermal coefficient of expansion to temperature for extrusion-formed and molded polyimide coalesced shaped articles.
Figure 4:
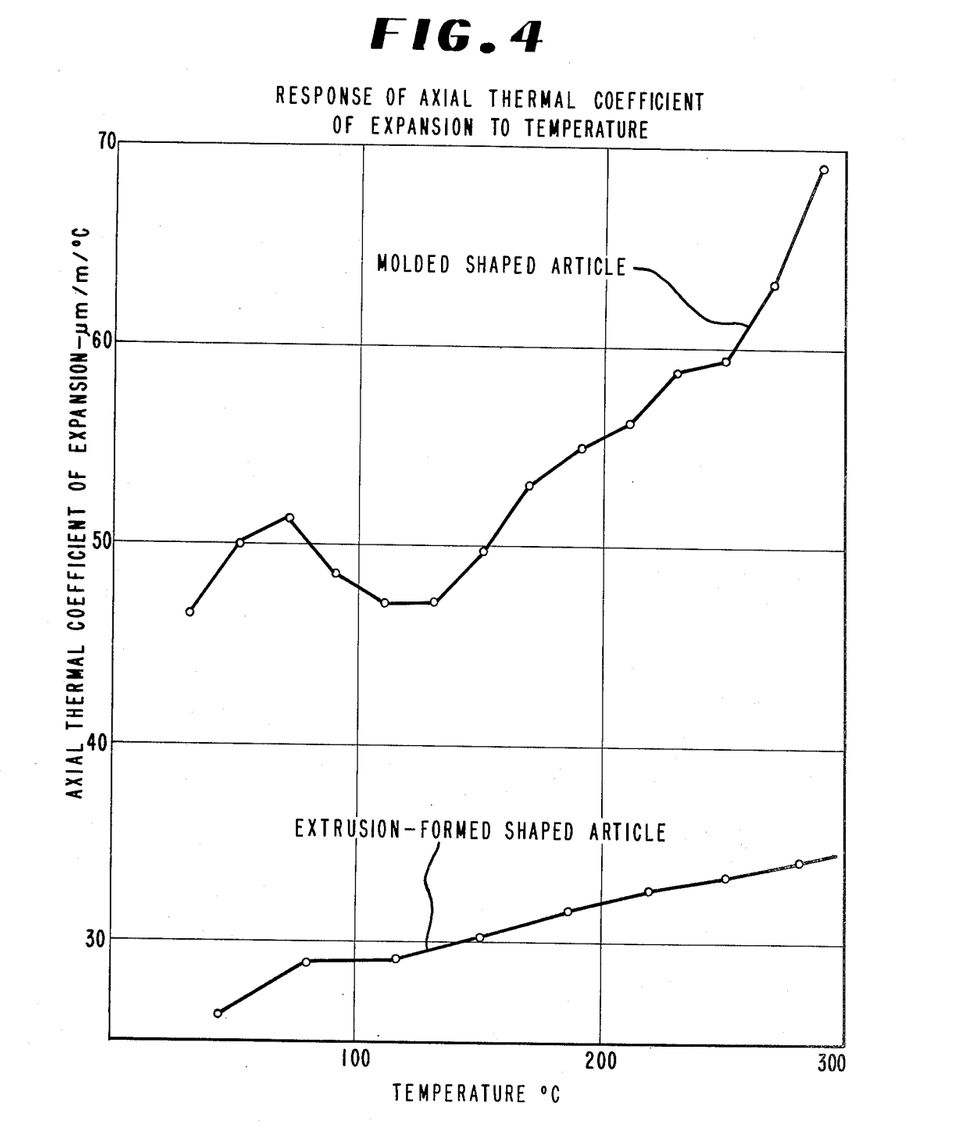
FIG. 4 shows the response of axial thermal coefficient of expansion to temperature for extrusion-formed and molded polyimide coalesced shaped article, filled with 15% by weight of graphite.

FIGS. 3 and 4 compare the axial thermal coefficient of expansion of extrusion-formed and coalesced shaped articles and isostatically formed or molded and coalesced shaped articles for the tested polyimide resins, as a function of temperature. These data were determined with standard ASTM test procedure No. D-696 based on specimens 12.7 mm × 12.7 mm × 50.8 mm long. The radial expansion of the extrusion-formed shaped article made from the basic polyimide resin was found to be very similar to the isostatically-molded shaped article up to a temperature of about 200° C. Above this temperature, the coefficient of expansion of the isostatically-molded shaped article increases sharply while that of the extruded shaped article remains substantially constant. The axial expansion, as shown in FIGS. 3 and 4, of the extruded shaped article is markedly lower than that of isostatically-molded shaped article. For example, as is seen the axial thermal coefficient of expansion for the extrusion-formed shaped article is less than about 50 μm/m/°C. at a temperature of from about room temperature to 300° C. whereas the molded shaped article has an axial thermal coefficient of expansion which is over 80 μm/m/°C. at about 300° C. The results for polyimide resin containing 15% by weight graphite are similar to those of basic resin except the radical coefficient of such extrusion-formed shaped article is about 15% higher than that of molded shaped article at temperatures below about 200° C. It is apparent that the radial expansion of extruded and molded shaped articles are about comparable while the axial expansion of the extruded shaped article is markedly lower than that of molded shaped article. Thus, the volumetric expansion of extruded shaped article is significantly less than that of isostatic or molded shaped article.

EXAMPLE 5

A series of polyimide samples were examined to observe and characterize the presence of orientation in them. X-ray photographs from the samples demonstrated that the samples identified as being isostatically-produced were substantially unoriented while the other extruded samples were obviously oriented. Five of the seven samples were selected for more precise analysis on a three-circle diffractometer.

The diffractometer analysis demonstrated that the orientation in the extruded samples is axial, with the molecular c-axis parallel to the extrusion direction. This is the sort of orientation found in fibers and monofilaments and commonly is referred to as "fiber-orientation". For these samples it is possible to give measures of both the sharpness of the orientation and the amount of it (fraction of crystalline polymer oriented). The sharpness is measured by the half-width, $W_{\frac{1}{2}}$, of the (002) orientation scan; the amount of orientation is measured by the orientation index, O.I., which is a ratio of the "oriented intensity" to the total of "oriented" plus "unoriented".

The quantitative results from the five selected samples are listed in Table III. The sintered isostatic sample appears to have a small but real degree of orientation. However, $W_{\frac{1}{2}}$ could not be reliably measured for this sample.

TABLE III

| Shaped Article Ram-Extruded | Half Width-$W_{\frac{1}{2}}$ | Orientation Index |
|---|---|---|
| Green Rod | 65.8 | 0.73 |
| Sintered Rod | 42.2 | 0.95 |
| Sintered Rod* | 70.2 | 0.66 |
| Sintered Tube | 67.8 | 0.75 |
| Sintered Tube | 69.0 | 0.61 |
| Non-extruded Isostatic Article* | — | 0.10 |

*Contains 15% by weight graphite.

From this it will be seen that the ram-extruded shaped articles have substantial orientation while the isostatic (non-extruded) shaped article does not.

Comparison of the physical properties of extruded rods and tubes from 3.2 mm diameter to 32 mm diameter with those of isostatic product shows the following significant differences.

1. Extruded shaped articles are highly oriented in the extrusion direction and are unique in this regard.
2. The orientation increases axial tensile strength of extruded articles while radial strength remains normal. For polyimide resins, the increase can be twice the normal values for isostatic articles. Fillers reduce the effect, the increase being about 1.25× for the graphite-filled polyimide resins.
3. The orientation in extruded stock produces anisotropic thermal expansion behavior. The radial expansion of extruded stock is comparable to that of isostatic article while the axial expansion is substantially lower than that of such isostatic article. This is significant since the expansion of an isostatically-molded article is not significantly different in the radial and in the axial directions. Thus, extruded stock is characterized by a lower volumetric expansion than is the isostatic article.
4. X-ray studies show samples of isostatic articles to be substantially unoriented while samples of extruded articles were obviously oriented. The orientation is, in kind, that found in fibers and monofilaments and commonly referred to as "fiber orientation". For compression moldings made by use of the simultaneous application of heat at high temperatures and of pressure on a resin in a mold, the orientation was observed to be planar with the polymer molecules tending to be perpendicular to the compression direction. This is the reverse of the orientation observed in the extruded article. This type of measurement distinguishes the extruded article from all other forms.

A Best Mode for Carrying Out the Invention

A best mode for carrying out the invention may best be practiced by referring to FIG. 2, which shows a preferred die and by following the foregoing description in Example 2, for instance, of the operation of an apparatus including this die for forming a shaped article, which also is a part of this invention.

Industrial Applicability

Among the ways this invention is capable of exploitation in industry is that it gives to the extrusion art a method and apparatus heretofore not available to it, that being, an apparatus and method for forming, without cracking, shaped articles from non-melt fabricatable aromatic polyimide and polyamide resins; it also gives to the extruded article art, an improved shaped article formed of these resins having orientation for better strength and low thermal expansion, as well as many other desired properties, which make such articles useful, for example, as high temperature mechanical and electrical parts, such as bearings and seals, particularly those requiring low thermal expansion.

I claim:

1. A method of forming a shaped article from non-melt fabricatable particulate aromatic polyimide or aromatic polyamide resin in a die having means defining (a) a compaction zone, followed by (b) a back pressure zone, followed by (c) a relief zone
   such method including the steps of:
   (1) compacting such resin in the compaction zone, at a temperature of from about room temperature to 400° C., while simultaneously
   (2) providing back pressure on such resin at the exit of the compaction zone by moving the compacted resin through the back pressure zone, and, thereafter,
   (3) relieving the pressure on such resin in the relief zone to control the rate of elastic recovery thereof, resulting in a radial recovery of the compacted resin of about 3 to 5 percent as such compacted resin is moved through the relief zone to form the shaped article.

2. The method of claim 1 wherein such resin is an aromatic polyimide.

3. The method of claim 1 wherein such resin is an aromatic polyamide.

4. A method of forming a coalesced shaped article from non-melt fabricatable particulate aromatic polyimide or arcmatic polyamide resin, such method including the steps of:
   (1) compacting such resin in a compaction zone at a temperature of from about room temperature to 400° C., while simultaneously
   (2) providing back pressure on such resin at the exit of the compaction zone by moving the compacted resin through a back pressure zone,
   (3) controlling the rate of elastic recovery of the resin by slowly relieving the pressure on such resin by moving the compacted resin through a relief zone, resulting in a radial recovery of the compacted resin of about 3 to 5 percent, to form a shaped article, and
   (4) heating the shaped article at a temperature above about 250° C. and for a time sufficient to coalesce the resin to form the coalesced shaped article.

5. The method of claim 4 wherein such resin is an aromatic polyimide.

6. The method of claim 4 wherein such resin is an aromatic polyamide.

7. An extruded, coalesced, shaped article formed of a non-melt fabricatable particulate aromatic polyimide or aromatic polyamide resin, such shaped article being oriented primarily in the direction of extrusion and having a thermal expansion in the axial direction of less than about 50 μm/m/°C. at at temperature of from about room temperature to 300° C.

8. The shaped article of claim 7 wherein such resin is an aromatic polyimide.

9. The shaped article of claim 7 wherein such shaped article is a tube and the thickness of the walls thereof is less than about 25 mm.

10. The shaped article of claim 7 wherein such shaped article is a rod having a diameter of less than about 25 mm.

* * * * *